US009352193B2

United States Patent
Blink et al.

(10) Patent No.: US 9,352,193 B2
(45) Date of Patent: May 31, 2016

(54) GOLF BALL LAYERS BASED ON POLYALKENAMER / IONOMER/ POLYAMIDE BLENDS

(71) Applicant: Acushnet Company, Fairhaven, MA (US)

(72) Inventors: Robert Blink, Newport, RI (US); Douglas S. Goguen, New Bedford, MA (US); Brian Comeau, Berkley, MA (US); David A. Bulpett, Boston, MA (US); Mark L. Binette, Mattapoisett, MA (US); Michael J. Sullivan, Old Lyme, CT (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/476,811

(22) Filed: Sep. 4, 2014

(65) Prior Publication Data

US 2014/0371003 A1    Dec. 18, 2014

Related U.S. Application Data

(63) Continuation of application No. 12/972,734, filed on Dec. 20, 2010, now abandoned.

(51) Int. Cl.
*A63B 37/02* (2006.01)
*A63B 37/00* (2006.01)
(Continued)

(52) U.S. Cl.
CPC ......... *A63B 37/0059* (2013.01); *A63B 37/0003* (2013.01); *A63B 37/0024* (2013.01);
(Continued)

(58) Field of Classification Search
CPC ........... A63B 37/0003; A63B 37/0024; A63B 37/0051; A63B 37/0059; C08L 19/00; C08L 21/00; C08L 23/0876; C08L 33/02; C08L 2205/03
See application file for complete search history.

(56) References Cited

U.S. PATENT DOCUMENTS

| | | |
|---|---|---|
| 3,264,269 A | 8/1966 | Rees |
| 3,317,631 A | 5/1967 | Rees |

(Continued)

FOREIGN PATENT DOCUMENTS

| | | | |
|---|---|---|---|
| EP | 0141630 | * 5/1985 | ............... C08F 8/44 |
| JP | 07-316368 | 5/1995 | |
| JP | 1995-003042 | 7/1996 | |

OTHER PUBLICATIONS

Evonik Industries, Vestenamer 8012 rubber with unique properties, Mar. 2009.

(Continued)

*Primary Examiner* — John E Simms, Jr.
(74) *Attorney, Agent, or Firm* — Daniel W. Sullivan (57) ABSTRACT

Multi-piece golf balls containing a core of at least one layer and cover of at least one layer are provided. At least one component is formed from a rubber composition comprising: i) about 10 to about 65 weight percent of a cycloalkene rubber having a trans-content of about 55% or greater and a melting point of 30° C. or greater; ii) about 30 to about 80 weight percent of an ionomeric resin; and 3) about 5 to about 40 weight percent of a polyamide. The rubber composition may further include other thermoplastic and thermosetting materials such as, for example, polybutadiene, polyisoprene, ethylene propylene rubber, ethylene propylene diene rubber, and styrene-butadiene rubber. The rubber composition helps improve resiliency, durability, scuff-resistance, and feel of the ball.

14 Claims, 2 Drawing Sheets

(51) Int. Cl.
  *A63B 37/04* (2006.01)
  *C08L 19/00* (2006.01)
  *C08L 23/08* (2006.01)
  *C08L 33/02* (2006.01)
  *C08L 21/00* (2006.01)

(52) U.S. Cl.
  CPC ............ *A63B37/0051* (2013.01); *A63B 37/04* (2013.01); *C08L 19/00* (2013.01); *C08L 23/0876* (2013.01); *C08L 33/02* (2013.01); *C08L 21/00* (2013.01); *C08L 2205/03* (2013.01)

(56) References Cited

U.S. PATENT DOCUMENTS

| | | | |
|---|---|---|---|
| 4,404,325 | A | 9/1983 | Mason et al. |
| 5,567,772 | A | 10/1996 | Hagman et al. |
| 5,599,877 | A | 2/1997 | Wang et al. |
| 5,886,103 | A | 3/1999 | Bellinger et al. |
| 5,902,869 | A | 5/1999 | Chou |
| 6,756,443 | B2 | 6/2004 | Feinberg |
| 6,800,690 | B2 | 10/2004 | Rajagopalan et al. |
| 6,953,820 | B2 | 10/2005 | Statz et al. |
| 7,528,196 | B2 | 5/2009 | Kim et al. |
| 2002/0004555 | A1 | 1/2002 | Di-Benedetto et al. |
| 2002/0013413 | A1 | 1/2002 | Bellinger et al. |
| 2002/0099136 | A1 | 7/2002 | Park et al. |
| 2003/0008975 | A1 | 1/2003 | Takesue et al. |
| 2003/0229183 | A1 | 12/2003 | Voorheis et al. |
| 2004/0097653 | A1 | 5/2004 | Kim et al. |
| 2004/0254298 | A1 | 12/2004 | Kim et al. |
| 2005/0137344 | A1 | 6/2005 | Voorheis |
| 2005/0197427 | A1* | 9/2005 | Nagasawa .......... A63B 37/0024 523/201 |
| 2006/0094539 | A1* | 5/2006 | Sullivan ............. A63B 37/0003 473/371 |
| 2007/0015605 | A1 | 1/2007 | Kim et al. |
| 2008/0248898 | A1* | 10/2008 | Morgan ............. A63B 37/0003 473/373 |
| 2009/0191981 | A1* | 7/2009 | Kim .................... A63B 37/0003 473/373 |
| 2009/0298372 | A1 | 12/2009 | Chou et al. |
| 2010/0160079 | A1 | 6/2010 | Kim et al. |
| 2010/0167845 | A1 | 7/2010 | Kim et al. |

OTHER PUBLICATIONS

Struktol, Creanova—Vestenamer 80132, Oct. 12, 1999.

* cited by examiner

GOLF BALL LAYERS BASED ON POLYALKENAMER / IONOMER/ POLYAMIDE BLENDS

CROSS-REFERENCE TO RELATED APPLICATIONS

This application is a continuation of co-pending, co-assigned U.S. patent application Ser. No. 12/972,734 having a filing date of Dec. 20, 2010, the entire disclosure of which is hereby incorporated herein by reference.

BACKGROUND OF THE INVENTION

1. Field of the Invention

The present invention generally relates to golf balls and more particularly to golf balls having components made of polyalkenamer/ionomer/polyamide blended compositions. The golf ball includes a core having at least one layer and cover having at least one layer. The golf ball may include at least one intermediate layer disposed between the core and cover. The resulting ball has high resiliency, durability, good scuff-resistance, and a soft feel.

2. Brief Review of the Related Art

Multi-piece solid golf balls having an inner core and outer cover with at least one intermediate layer disposed there between are popular today among professional and recreational golfers. In such balls, the inner core is made commonly of a natural or synthetic rubber, such as polybutadiene, styrene butadiene, poly(cis-isoprene), or poly(trans-isoprene), or highly neutralized acid copolymers. Often, the intermediate layer is made of an olefin-based ionomer resin that imparts hardness to the ball. These ionomer acid copolymers contain inter-chain ionic bonding, and are generally made of an α-olefin such as ethylene and a vinyl comonomer having an acid group such as methacrylic, acrylic acid, or maleic acid. Metal ions such as sodium, lithium, zinc, and magnesium are used to neutralize the acid groups in the copolymer. Commercially available olefin-based ionomer resins are available in various grades and identified based on the type of base resin, molecular weight, and type of metal ion, amount of acid, degree of neutralization, additives, and other properties. The outer covers of conventional golf balls are made from a variety of materials including ionomers, polyamides, polyesters, and thermoplastic and thermoset polyurethane and polyureas.

Manufacturers of golf balls are constantly looking at new materials for developing multi-piece, solid balls. Different materials can be used to impart specific properties and features to the ball. For example, Chou et al., US Patent Application publication 2009/0298372 discloses a blend comprising an ionomer and a polyamide that can be used in making multi-layered structures including floor coverings, furniture film coverings, ski tops, auto interior layers, and sporting goods such as golf balls. The ionomer is derived from at least three repeat units derived from ethylene, an α,β-unsaturated $C_3$-$C_8$ carboxylic acid, and a dicarboxylic acid or its derivative. The polyamides are derived from one or more lactams or amino acids and include nylon 6, nylon 11, or nylon 12.

Kim et al., U.S. Pat. No. 7,528,196 and U.S. Patent Application Publication US 2009/0191981 disclose a golf ball comprising a core, cover layer, and optionally one or more inner cover layers, wherein at least one portion of the ball comprises a blend of a polyalkenamer and polyamide. The polyalkenamer/polyamide composition contains about 2 to about 90 weight % of a polyalkenamer polymer and about 10 to about 98 weight % of a polyamide. The '196 patent and '981 Published Application further disclose that the polyalkenamer/polyamide composition may be blended with other polymers including unimodal ionomers, bimodal ionomers, modified unimodal ionomers, and modified bimodal ionomers. However, neither the '196 patent nor '981 Published Application discloses a composition comprising i) about 10 to about 65 weight percent of a polyalkenamer rubber; ii) about 30 to about 80 weight percent of an ionomeric resin; and 3) about 5 to about 40 weight percent of a polyamide.

One objective of the present invention is to develop compositions that can be used to make a golf ball having high resiliency, durability, and scuff-resistance along with a comfortable and soft "feel." The present invention provides golf ball core compositions having such properties as well as other advantageous characteristics, features, and benefits.

SUMMARY OF THE INVENTION

The present invention provides a golf ball comprising a core having at least one layer and cover having at least one layer. In one preferred embodiment, the ball contains a core having a diameter of about 1.26 to about 1.60 inches and surface hardness of about 30 to about 65 Shore D; at least one intermediate layer having a thickness of about 0.015 inches to about 0.120 inches and surface hardness of about 45 to about 75 Shore D; and a cover having a thickness of about 0.015 inches to about 0.090 inches and surface hardness of about 40 to about 70 Shore D. At least one of the core, intermediate layer, or cover is formed from a rubber composition comprising: i) about 10 to about 65 weight percent of a cycloalkene (polyalkenamer) rubber having a trans-content of about 55% or greater and a melting point of 30° C. or greater; ii) about 30 to about 80 weight percent of an ionomeric resin; and 3) about 5 to about 40 weight percent of a polyamide based on weight of composition. Preferably, the cycloalkene rubber has a trans-content of 75% or greater and a melting point of 50° C. or greater. In one version, the rubber composition further comprises peroxide in an amount of 2.5 phr or greater based on weight of rubber.

Different blends of cyclolalkene rubber, ionomer polymer, and polyamide may be used in accordance with the invention. For instance, in one version, the composition comprises about 30 wt. % cycloalkene rubber; about 50 wt. % ionomer polymer, and about 20 wt. % polyamide. In a second version, the composition comprises about 40 wt. % cycloalkene rubber; about 40 wt. % ionomer polymer, and about 20 wt. % polyamide. In yet another embodiment, the composition comprises about 50 wt. % cycloalkene rubber; about 25 wt. % ionomer polymer; and about 25 wt. % polyamide. The golf ball may have different constructions. For example, a single or dual core may be formed from the rubber composition to provide the ball with high resiliency and rebounding performance. In another embodiment, the intermediate layer (for example, inner cover) or outer cover is made of the rubber composition and this provides the ball with good durability and scuff-resistance, and a soft feel.

In one embodiment, a solid, single core having an outer surface and geometric center is provided, wherein the hardness of the outer surface is greater than the hardness of the geometric center to define a positive hardness gradient of at least 10 Shore C. In one embodiment, a dual-core having an inner core and surrounding outer core layer is provided. The outer core layer has a second outer surface and an inner surface. The inner and or outer core may be made of the rubber composition and have a positive hardness gradient. In one example, the hardness of the second outer surface is greater than the hardness of the inner surface to define a second positive hardness gradient. In another example, the hardness of the second outer surface is the same or less than the hardness of the inner surface to define a zero or negative hardness gradient.

In another embodiment, a rubber composition comprising: i) about 10 to about 65 weight percent of a cycloalkene (polyalkenamer) rubber having a trans-content of about 55% or greater and a melting point of 30° C. or greater; ii) about 30 to about 80 weight percent of an ionomeric resin; and iii) about 5 to about 40 weight percent of a polyamide may be prepared. The composition may be used in many different applications including, but not limited to, interior and exterior automotive parts, cable and wire jacketing, perfume caps, footwear, film, coating and packaging, including multilayer food packaging, and a wide variety of sporting goods.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

The present invention relates generally to golf balls containing a component made from a rubber composition comprising: i) about 10 to about 65 weight percent of a cycloalkene rubber having a trans-content of about 55% or greater and a melting point of 30° C. or greater; ii) about 30 to about 80 weight percent of an ionomeric resin; and 3) about 5 to about 40 weight percent of a polyamide based on weight of composition.

Golf balls having various constructions may be made in accordance with this invention. For example, golf balls having two-piece, three-piece, four-piece, and five-piece constructions with single or multi-layered cores and cover materials may be made The term, "layer" as used herein means generally any spherical portion of the golf ball. More particularly, in one version, a three-piece golf ball having a solid center (otherwise referred to as an inner core) and a multi-layered cover (having an inner cover layer and outer cover layer) is made. In another version, a four-piece golf ball comprising a dual-core having an inner core and a surrounding outer core layer and a multi-layered cover is made. In yet another construction, a five-piece golf ball having a dual-core, intermediate layer, and multi-layered cover is made. The golf balls of this invention preferably include at least one intermediate layer. As used herein, the term, "intermediate layer" means a layer of the ball disposed between the core and cover. The intermediate layer may be considered an outer core layer, or inner cover layer, or any other layer disposed between the inner core and outer cover of the ball. The intermediate layer also may be referred to as a casing or mantle layer.

In accordance with the present invention, at least one of the core, intermediate, and cover layers of the golf ball is formed from the rubber composition of this invention. The diameter and thickness of the different layers along with properties such as hardness and compression may vary depending upon the construction and desired playing performance properties of the golf ball. The core may contain sections having substantially the same hardness or different hardness levels. That is, there can be substantially uniform hardness throughout the different sections of the core or there can be hardness gradients as discussed in further detail below.

Polyamides

In general, polyamides refer to high molecular weight polymers in which amide linkages (—CONH—) occur along the length of the molecular chain (*Hawley's Condensed Chemical Dictionary*, 13$^{th}$ Ed.). Suitable polyamides for use in the compositions of this invention may be obtained, for example, by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine. Specific examples of suitable polyamides include, but are not limited to, nylon 6, nylon 66, nylon 610, nylon 11, and nylon 12.

More particularly, the polyamide may be any homopolyamide or copolyamide. One example of a group of suitable polyamides is thermoplastic polyamide elastomers. Thermoplastic polyamide elastomers typically are copolymers of a polyamide and polyester or polyether. For example, the thermoplastic polyamide elastomer can contain a polyamide (nylon 6, nylon 6,6, nylon 11, nylon 12 and the like) as a hard segment and a polyether or polyester as a soft segment. In one specific example, the thermoplastic polyamides are amorphous copolyamides based on polyamide 12. Polyamide homopolymers are produced by two common methods. In the first, a compound containing one organic acid-type end group and one amine end group is formed into a cyclic monomer. The polyamide is then formed from the monomer by a ring-opening polymerization. These polyamides are commonly designated as nylon 6, nylon 11, nylon 12, and the like, where the number indicates the number of carbon atoms making up the ring in the monomer. The second method involves the condensation polymerization of a dibasic acid and a diamine. These polyamides are commonly designated as nylon 4,6, nylon 6,6, nylon 6,9, nylon 6,10, nylon 6,12, and the like, where the first number indicates the number of carbon atoms connecting the two amine groups in the diamine and the second number indicates the number of carbon atoms connecting the two acid groups in the dibasic acid, including those in the acid groups. For example, nylon 6 is a homopolymer of caprolactam, that is, polycaprolactam. Nylon 6,6 is the reaction product of hexamethylenediamine and adipic acid.

Preferred polyamide homopolymers include nylon 4, nylon 6, nylon 7, nylon 11, nylon 12, nylon 13, nylon 4,6, nylon 6,6, nylon 6,9, nylon 6,10, nylon 6,12, nylon 12,12, nylon 13,13 and mixtures thereof. More preferred polyamide homopolymers include nylon 6, nylon 11, nylon 12, nylon 4,6, nylon 6,6, nylon 6,9, nylon 6,10, nylon 6,12 and mixtures thereof. The most preferred polyamide homopolymers are nylon 11 and nylon 12.

One class of copolyamide elastomers are polyether amide elastomers. Illustrative examples of polyether amide elastomers are those that result from the copolycondensation of polyamide blocks having reactive chain ends with polyether blocks having reactive chain ends, including:

(a) polyamide blocks of diamine chain ends with polyoxyalkylene sequences of dicarboxylic chains;

(b) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and (c) polyamide blocks of dicarboxylic chain ends with polyether diols, the products obtained, in this particular case, being polyetheresteramides.

More specifically, the polyamide elastomer can be prepared by polycondensation of the components (i) a diamine and a dicarboxylate, lactams or an amino dicarboxylic acid (PA component), (ii) a polyoxyalkylene glycol such as polyoxyethylene glycol, polyoxy propylene glycol (PG component) and (iii) a dicarboxylic acid.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences is preferably between about 300 and 15,000, and more preferably between about 600 and 5,000. The molecular weight of the polyether sequences is preferably between about 100 and 6,000, and more preferably between about 200 and 3,000.

The amide block polyethers may also comprise randomly distributed units. These polymers may be prepared by the simultaneous reaction of polyether and precursor of polyamide blocks. For example, the polyether diol may react with a lactam (or alpha-omega amino acid) and a diacid which limits the chain in the presence of water. A polymer is obtained that has primarily polyether blocks and/or polyamide blocks of very variable length, but also the various reactive groups that have reacted in a random manner and which are distributed statistically along the polymer chain. Suitable amide block polyethers include those as disclosed in U.S. Pat. Nos. 4,331,786; 4,115,475; 4,195,015; 4,839,441; 4,864,014; 4,230,848 and 4,332,920.

The polyether may be, for example, a polyethylene glycol (PEG), a polypropylene glycol (PPG), or a polytetramethylene glycol (PTMG), also designated as polytetrahydrofuran (PTHF). The polyether blocks may be along the polymer chain in the form of diols or diamines. However, for reasons of simplification, they are designated PEG blocks, or PPG blocks, or also PTMG blocks. The polyether block comprises different units such as units which derive from ethylene glycol, propylene glycol, or tetramethylene glycol.

The amide block polyether comprises at least one type of polyamide block and one type of polyether block. Mixing of two or more polymers with polyamide blocks and polyether blocks may also be used. The amide block polyether also can comprise any amide structure made from the method described on the above. Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of 1/1 to 3/1.

One type of polyetherester elastomer is the family of PEBAX polymers, which are available from Arkema, Inc. Preferably, the choice can be made from among PEBAX 2533, 3533, 4033, 1205, 7033 and 7233. Blends or combinations of PEBAX 2533, 3533, 4033, 1205, 7033 and 7233 can also be prepared, as well. PEBAX 2533 has a hardness of about 25 shore D (according to ASTM D-2240), a Flexural Modulus of 2.1 kpsi (according to ASTM D-790), and a Bayshore resilience of about 62% (according to ASTM D-2632). PEBAX 3533 has a hardness of about 35 shore D (according to ASTM D-2240), a Flexural Modulus of 2.8 kpsi (according to ASTM D-790), and a Bayshore resilience of about 59% (according to ASTM D-2632). PEBAX 7033 has a hardness of about 69 shore D (according to ASTM D-2240) and a Flexural Modulus of 67 kpsi (according to ASTM D-790). PEBAX 7333 has a hardness of about 72 Shore D (according to ASTM D-2240) and a Flexural Modulus of 107 kpsi (according to ASTM D-790).

Some examples of suitable polyamides for use in the polyalkenamer/polyamide/ionomer compositions include those commercially available under the tradenames, PEBAX, CRISTAMID and RILSAN marketed by Arkema Inc. of Philadelphia, Pa., GRIVORY and GRILAMID marketed by EMS-Grivory of Sumter, S.C., TROGAMID and VESTAMID available from Evonik Industries of Parsippany, N.J., and ZYTEL marketed by E.I. DuPont de Nemours & Co., of Wilmington, Del.

The polyamide is used in an amount of at least about 5% by weight based on total weight of composition and is generally present in an amount of about 5% to about 60%, or an amount within a range having a lower limit of 5% or 10% or 15% or 20% or 25% or 30% and an upper limit of 35% or 40% or 45% or 50% or 55% or 60%. Preferably, the concentration of polyamide is about 10 to about 40 weight percent and more preferably about 15 to about 35 weight percent.

Ionomers

Suitable ionomer resins that may be used in the compositions of this invention are generally referred to as copolymers of $\alpha$-olefin; $C_3$ to $C_8$ $\alpha,\beta$-ethylenically unsaturated mono- or dicarboxylic acid; and optional softening monomer. The $\alpha$-olefin is preferably ethylene or $C_3$ to $C_8$. These ionomers may be prepared by methods known in the art. Copolymers may include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl(meth)acrylate, ethylene/(meth)acrylic acid/iso-butyl(meth)acrylate, ethylene/(meth)acrylic acid/methyl(meth)acrylate, ethylene/(meth)acrylic acid/ethyl(meth)acrylate terpolymers, and the like. The term "copolymer," as used herein, includes polymers having two types of monomers, those having three types of monomers, and those having more than three types of monomers. Preferred $\alpha,\beta$-ethylenically unsaturated mono- or dicarboxylic acids are (meth)acrylic acid, ethacrylic acid, maleic acid, crotonic acid, fumaric acid, itaconic acid. (Meth) acrylic acid is most preferred. As used herein, "(meth)acrylic acid" means methacrylic acid and/or acrylic acid. Likewise, "(meth)acrylate" means methacrylate and/or acrylate.

When a softening monomer is included, such copolymers are referred to herein as E/X/Y-type copolymers, wherein E is ethylene; X is a $C_3$ to $C_8$ $\alpha,\beta$-ethylenically unsaturated mono- or dicarboxylic acid; and Y is a softening monomer. The softening monomer is typically an alkyl(meth)acrylate, wherein the alkyl groups have from 1 to 8 carbon atoms. Preferred E/X/Y-type copolymers are those wherein X is (meth)acrylic acid and/or Y is selected from (meth)acrylate, n-butyl(meth)acrylate, isobutyl(meth)acrylate, methyl(meth)acrylate, and ethyl(meth)acrylate. More preferred E/X/Y-type copolymers are ethylene/(meth)acrylic acid/n-butyl acrylate, ethylene/(meth)acrylic acid/methyl acrylate, and ethylene/(meth)acrylic acid/ethyl acrylate.

The amount of ethylene or $C_3$ to $C_6$ α-olefin in the acid copolymer is typically at least 15 wt. %, preferably at least 25 wt. %, more preferably least 40 wt. %, and even more preferably at least 60 wt. %, based on the total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on the total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on the total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The acidic groups in the copolymeric ionomers are partially or totally neutralized with a cation source. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof. The amount of cation used in the composition is readily determined based on desired level of neutralization. For example, ionomeric resins having acid groups that are neutralized from about 10 percent to about 100 percent may be used. In one embodiment, the acid groups are partially neutralized. That is, the neutralization level is from about 10 to about 80%, more preferably 20 to 70%, and most preferably 30 to 50%. In another embodiment, the acid groups are highly or fully neutralized. That is, the neutralization level is from about 80 to about 100%, more preferably 90 to 100%, and most preferably 95 to 100%.

It is also known that organic acids or salts of organic acids, particularly fatty acids, may be added to the ionomer resin to help make the composition more processable. This may be accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%). The organic acids may be aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, and salts of fatty acids, particularly stearic, behenic, erucic, oleic, linoelic or dimerized derivatives thereof. It is preferred that the organic acids and salts be relatively non-migratory (they do not bloom to the surface of the polymer under ambient temperatures) and non-volatile (they do not volatilize at temperatures required for melt-blending).

In one embodiment, a partially or fully neutralized ionomer is added to a blend of polyamide and polyalkenamer rubber. In another embodiment, a blend of lowly or non-neutralized ionomer (for example, ethylene-(meth)acrylic acid copolymer) may be first blended with the polyamide and polyalkenamer rubber in accordance with this invention, followed by neutralization in-situ with a cation source, and optionally fatty acids or fatty acid salts may be added to the mixture.

The amount of ionomer resin added to the polyamide/polyalkenamer rubber is such that the blend contains ionomer an amount of at least about 20% by weight based on total weight of composition and is generally present in an amount of about 20% to about 80%, or an amount within a range having a lower limit of 20% or 30% or 40% or 45% and an upper limit of 50% or 60% or 70% or 80%. Preferably, the concentration of ionomer is at least 40% and more preferably about 40% to about to about 70%.

Polyalkenamer Rubber

Suitable cycloalkene rubbers that can be used in the compositions of this invention are rubbery polymers made from one or more cycloalkenes having from 5 to 20, preferably 5 to 15, ring carbon atoms. The cycloalkene rubbers (also referred to as polyalkenylene or polyalkenamer rubbers) may be prepared by ring opening metathesis polymerization of one or more cycloalkenes in the presence of organometallic catalysts as is known in the art. Such polymerization methods are disclosed, for example, in U.S. Pat. Nos. 3,492,245 and 3,804,803, the disclosures of which are hereby incorporated by reference. By the term, "cycloalkene rubber" as used herein, it is meant a compound having at least 20 weight % macrocycles (cyclic content). The cyclic and linear portions of the cycloalkene rubber have the following general chemical structures:

n = 30-10000

Suitable cyclic olefins that can be used to make the cycloalkene rubber include unsaturated hydrocarbons with 4 to 12 ring carbon atoms in one or more rings e.g., 1-3 rings, which exhibit in at least one ring an unsubstituted double bond which is not in conjugation to a second double bond which may be present and which may have any degree of substitution; the substituents must not interfere with the metathesis catalysts and are preferably alkyl groups of 1 to 4 carbon atoms or a part of a cyclic structure of 4 to 8 carbon atoms. Examples are cyclobutene, cyclopentene, cycloheptene, cis- and trans-cyclooctene, cyclononene, cyclodecene, cycloundecene, cis- and trans-cyclododecene, cis, cis-cyclooctadiene, 1-methyl-1,5-cyclooctadiene, 3-methyl-1,5-cyclooctadiene, and 3,7-dimethyl-1,5-cyclooctadiene.

Examples of suitable polyalkenamer rubbers are polypentenamer rubber, polyheptenamer rubber, polyoctenamer rubber, polydecenamer rubber and polydodecenamer rubber. Polyoctenamer rubbers are commercially available from Evonik Degussa GmbH of Marl, Germany and sold under the VESTENAMER tradename. The polyalkenamer rubber used in the present invention preferably has a trans-bond content of about 55% or greater and a second heat melting point of about 30° C. or greater. More preferably, the cycloalkene rubber has a trans-bond content of 75% or greater and a second heat melting point of 50° C. or greater. Furthermore, the polyalkenamer rubber material preferably has a molecular weight of about 80,000 or greater (measured according to GPC); a glass transition temperature (Tg) of about 55° C. or less (measured according to ISO 6721 or 4663); a cis-to-trans ratio of double bonds of about 40:60 or preferably about 20:80 (measured according to IR); a Mooney viscosity ML (1+4) 100° C. of less than about 10 (measured according to DIN 53 523 or ASTM-D 1646); a viscosity number J/23° C. of about 130 or preferably about 120 ml/g (measured according to ISO 1628-1); and a density of about 0.9 g/cm$^3$ or greater (measured according to DIN 53 479 A or ISO 1183).

The polyalkenamer rubber compound, of and by itself, has relatively high crystallinity. For example, a specific grade of polyalkenamer rubber (VESTENAMER 8012) has a crystallinity of approximately 30% (measured by DSC, second melting.) The ratio of cis double bonds to trans double bonds (cis/trans ratio) in the polymer is significant in determining the degree of crystallinity in the polymer. In general, if the trans-bond content of the polymer is relatively high, the crystallinity and melting point of the polymer is relatively high. That is, as the trans-bond content increases, the crystallinity of the polymer increases. The polyalkenamer rubber, VESTENAMER 8012 has a trans-bond content of about 80%. In accordance with the present invention, it has been found the compression of the cores is reduced and the Coefficient of Restitution ("COR") of the cores is increased when the rubber composition is cross-linked to a relatively high degree and the composition does not contain a reactive cross-linking co-agent such as zinc diacrylate (ZDA). The polyalkenamer rubber composition may be cured using a conventional curing process such as peroxide-curing, sulfur-curing, and high-energy radiation, and combinations thereof. For example, the composition may be peroxide-cured. When peroxide is added at relatively high amounts (particularly, at least 2.5 and preferably 5.0 phr) and the composition (which if it does not contain a reactive cross-linking co-agent such as ZDA) is cured to cross-link the rubber chains, then the compression of the polyalkenamer rubber cores is reduced and the COR of the cores is increased. It is believed this phenomenon is due, at least in part, to disrupting the crystalline structure of the polymer by curing and cross-linking the composition in accordance with this invention. While not wishing to be bound by any theory, it is believed the cross-linking disrupts the crystallinity of the material. It appears the crystallinity may be partially disrupted and the polymer remains in a partially crystalline state. As a result, the polyalkenamer rubber (in the absence of a reactive cross-linking co-agent such as ZDA) becomes softer and more rubbery and the compression of core samples made from the composition decreases.

One example of a commercially-available material that can be used in accordance with this invention is VESTENAMER 8012 (trans-bond content of about 80% and a melting point of about 54° C.). The material, VESTENAMER 6213 (trans-bond content of about 60% and a melting point of about 30°) also may be effective.

The polyalkenamer rubber is used in an amount of at least about 10% by weight based on total weight of composition and is generally present in an amount of about 15% to about 65%, preferably at least 20%, and more preferably about 30% to about 60%. In one preferred version of the composition, the blend comprises about 50 wt. % ionomer; about 20 wt. % polyamide; and about 30 wt. % polyalkenamer rubber. In a second preferred version, the blend comprises about 40 wt. % ionomer; about 20 wt. % polyamide; and about 40 wt. % polyalkenamer rubber. In yet another preferred embodiment, the blend comprises about 50 wt. % ionomer; about 25 wt. % polyamide; and about 25 wt. % polyalkenamer rubber.

In the present invention, it has been found that rubber compositions comprising a blend of polyalkenamer rubber/ionomer/and polyamide are particularly effective for providing golf balls having high resiliency, durability, scuff-resistance, and a soft feel. For example, the rubber compositions can be used to make a core that provides the golf ball with good rebounding properties (distance) without sacrificing a nice feel to the ball. The resulting ball has a relatively high COR allowing it to reach high velocity when struck by a golf club. Thus, the ball tends to travel a greater distance which is particularly important for driver shots off the tee. In addition, the composition also helps provide the ball with a soft feel and provides the player with a more pleasant sensation when he/she strikes the ball with the club. The player can sense more control over the ball as the club face makes impact. In general, the cores of this invention typically have a COR of about 0.76 or greater; and preferably about 0.80 or greater. The compression of the cores preferably is about 40 or greater; and more preferably in the range of about 50 to about 110. The compositions of this invention also may be used to form an intermediate layer (for example, inner cover) or an outer cover. The composition provides the ball with good hardness, durability, and scuff-resistance. It is believed the combination of ionomer, cycloalkene rubber, and polyamide helps provide the ball with toughness and protects the ball so it does not appear worn and damaged after repeated use.

The polyamide/ionomer/polyalkenamer rubber blend may contain other thermoplastic and thermosetting resins including, but not limited to, natural and synthetic rubbers such as polybutadiene, polyisoprene, ethylene propylene rubber, ethylene propylene diene rubber, styrene-butadiene rubber, and highly neutralized polymers (HNPs); thermoplastic elastomers, such as polyurethane, poly-ether-ester, poly-amide-ether, polyether-urea, the above-described PEBAX polyetherester elastomers, styrene-butadiene-styrene (SBS) block copolymers, styrene-(ethylene-butylene)-styrene block copolymers, and the like, polyamide (oligomeric and polymeric), polyesters, polyolefins including polyethylene, polypropylene, ethylene/propylene copolymers, and the like, ethylene copolymers with various comonomers, such as vinyl acetate, (meth)acrylates, (meth)acrylic acid, (ethyl)acrylates, (ethyl)acrylic acid, (butyl)acrylates, (butyl)acrylic acid, carbon monoxide, and epoxy-functionalized monomers, polycarbonates, acrylics, such as methyl methacrylate homopolymers or copolymers, polystyrene, polymers functionalized with maleic anhydride, epoxidization, and the like, either by copolymerization or by grafting, elastomers such as EPDM, metallocene catalyzed PE and copolymer, ground-up powders of the thermoset elastomers, and the like.

The polyamide/ionomer/polyalkenamer rubber blends of this invention can be used as thermoplastic compositions. That is, the thermoplastic material softens when exposed to heat and returns to its original condition when cooled. Alternatively, the polyamide/ionomer/polyalkenamer rubber blends may be cured, as described further below, to form a thermoset material. As opposed to the thermoplastic material, the cross-linking bonds of the thermoset composition become irreversibly set when cured. The cross-linking bonds are not broken when exposed to high temperatures. Thus, the thermoset materials are relatively rigid. In one embodiment, the polyalkenamer rubber may be cured and then the cured composition may be added to the mixture of polyamide and ionomer resin. In another version, the mixture of polyalkenamer, polyamide, and ionomer resin may be prepared first and then the composition may be cured.

Curing of Composition

The rubber compositions of this invention may be cured, either pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di (t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber.

In one preferred version, the peroxide free-radical initiator is present in an amount of at least 2.5 and more preferably 5 parts per hundred (phr). As further discussed in the Examples below, it is believed the high crystallinity of the polyalkenamer rubber is reduced by adding the peroxide at relatively high amounts to the rubber composition and curing the composition so it is cross-linked. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber composition may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the total rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (Zn-PCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include "fillers," which are added to adjust the density and/or specific gravity of the material. Suitable fillers include, but are not limited to, polymeric or mineral fillers, metal fillers, metal alloy fillers, metal oxide fillers and carbonaceous fillers. Fillers can be in the form of flakes, fibers, fibrils, or powders. Regrind, which is ground, recycled core material (for example, ground to about 30 mesh particle size), can also be used. The amount and type of fillers utilized are governed by the amount and weight of other ingredients in the golf ball, since a maximum golf ball weight of 45.93 g (1.62 ounces) has been established by the United States Golf Association (USGA). Suitable fillers generally have a specific gravity from about 2 to 20. In one preferred embodiment, the specific gravity can be about 2 to 6.

Suitable polymeric or mineral fillers include, for example, precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used.

In addition, the rubber compositions may include antioxidants to prevent the breakdown of the elastomers. Also, processing aids such as high molecular weight organic acids and salts thereof, may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.)

Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antioxidants, antiozonants, as well as other additives known in the art may be added to the rubber composition.

Other additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, tungsten, tungsten carbide, silica, lead silicate, regrind (recycled material), clay, mica, talc, nano-fillers, carbon black, glass flake, milled glass, and mixtures thereof. Suitable additives are more fully described in, for example, Rajagopalan et al., U.S. Patent Application Publication No. 2003/0225197, the entire disclosure of which is hereby incorporated herein by reference. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp, as disclosed, for example, in Chen, U.S. Pat. No. 7,504,448, the entire disclosure of which is hereby incorporated by reference.

Core, Intermediate, and Cover Layers

As discussed above, the composition of this invention may be used in the core, intermediate, or cover layers. When the polyalkenamer/ionomer/polyamide blends are not used in the core, the core is made preferably from rubber compositions containing a base rubber, free-radical initiator agent, cross-linking co-agent, and fillers. The base rubber may be selected, for example, from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers such as polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, acrylate rubbers, metallocene-catalyzed elastomers, and plastomers. Highly neutralized acid copolymers (HNPs), as known in the art, also can be used to form the core. The core composition may contain free-radical initiator agents, cross-linking co-agents, and fillers as described above. In one preferred embodiment, a polyalkenamer rubber, as described above, may be used to form a core having a positive hardness gradient as described further below.

When the polyalkenamer/ionomer/polyamide composition is not used in the intermediate layer, the layer may be formed from conventional thermoplastic or thermosetting compositions, particularly ionomeric or non-ionomeric materials as described above. The intermediate layer also may be formed of highly-neutralized polymers (HNPs). In a preferred embodiment, at least one intermediate layer of the golf ball is formed from an HNP material or a blend of HNP materials. The acid moieties of the HNPs, typically ethylene-based ionomers as described above, are preferably neutralized greater than about 70%, more preferably greater than about 90%, and most preferably at least about 100%. Suitable cation sources include metal cations and salts thereof, organic amine compounds, ammonium, and combinations thereof. Preferred cation sources are metal cations and salts thereof, wherein the metal is preferably lithium, sodium, potassium, magnesium, calcium, barium, lead, tin, zinc, aluminum, manganese, nickel, chromium, copper, or a combination thereof.

In one embodiment, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is a 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In one embodiment, the inner cover layer is preferably formed from a composition comprising a 50/45/5 blend of Surlyn® 8940/Surlyn® 9650/Nucrel® 960, and, in a particularly preferred embodiment, has a material hardness of from 80 to 85 Shore C. In another particular embodiment, the inner cover layer is preferably formed from a composition comprising a 50/25/25 blend of Surlyn® 8940/Surlyn® 9650/Surlyn® 9910, preferably having a material hardness of about 90 Shore C. In yet another particular embodiment, the inner cover layer is preferably formed from a composition comprising a 50/50 blend of Surlyn® 8940/Surlyn® 9650, preferably having a material hardness of about 86 Shore C. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

When the polyalkenamer/polyamide/ionomer blends are not used in forming the cover, other materials may be used including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Golf Ball Construction

In one preferred version of the golf ball, the core is a single-core constituting a solid core having a "positive" hardness gradient (that is, the outer surface of the core is harder than its geometric center.) In a second preferred embodiment, the core is a dual-core comprising an inner core and a surrounding outer core layer. The inner core has a "positive" hardness gradient and the outer core layer has a "negative" hardness gradient (that is, the outer surface of the outer core layer is softer than the inner surface of the outer core layer.) Other embodiments of golf balls having various combinations of positive, negative, and zero hardness gradients may be made in accordance with this invention. For example, the inner core may have a positive hardness gradient and the outer core layer also may have a positive hardness gradient. In another example, the inner core may have a positive hardness gradient and the outer core layer may have a "zero" hardness gradient. (That is, the hardness values of the outer surface of the outer core layer and the inner surface of the outer core layer are substantially the same.) Particularly, the term, "zero hardness gradient" as used herein, means a surface to center Shore C hardness gradient of less than 8, preferably less than 5 and most preferably less than 3 and may have a value of zero or negative 1 to negative 25. The term, "negative hardness gradient" as used herein, means a surface to center Shore C hardness gradient of less than zero. The terms, zero hardness gradient and negative hardness gradient, may be used herein interchangeably to refer to hardness gradients of negative 1 to negative 25. The term, "positive hardness gradient" as used herein, means a surface to center Shore C hardness gradient of 8 or greater, preferably 10 or greater, and most preferably 20 or greater. By the term, "steep positive hardness gradient" as used herein, it is meant surface to center Shore C hardness gradient of 20 or greater, more preferably 25 or greater, and most preferably 30 or greater. For example, the core may have a steep positive hardness gradient of 35, 40, or 45 Shore C or greater. Methods for measuring the hardness of the inner core and surrounding layers and determining the hardness gradients are discussed in further detail below.

In one preferred embodiment, a polyalkenamer rubber, as described above may be used to form the core. And, the polyamide/ionomer/polyalkenamer rubber blends may be used to form the intermediate and/or cover layers. The core composition may further include other rubbers such as, for example, polybutadiene, polyisoprene, ethylene propylene rubber, ethylene propylene diene rubber, and styrene-butadiene rubber. In one particularly preferred instance, the geometric center and the outer surface of the core each has a hardness, the hardness of the outer surface being greater than the hardness of the geometric center to define a positive hardness gradient of at least 10 Shore C units. For example, the hardness of the outer surface may be 80 to 95 Shore C units and the hardness of the center may be 50 to 60 Shore C units.

In a second preferred embodiment, the polyalkenamer rubber may be used to make a dual core comprising an inner core and an outer core layer. And, the polyamide/ionomer/polyalkenamer rubber blends may be used to form the intermediate and/or cover layers. A polybutadiene rubber is preferably used in the inner core and the polyalkenamer rubber is preferably used in the outer core layer. The outer core layer may have a positive hardness gradient as described above. Alternatively, the outer core layer may have a zero or negative hardness gradient. For example, the surface of the outer core layer (second outer surface) and inner surface of the core layer each may have a hardness, the hardness of the second outer surface being in the range of 50 to 85 Shore C units and the hardness of the inner surface being in the range of 51 to 86 Shore C units, wherein the hardness of the second outer surface being the same or less than the hardness of the inner surface to define a zero or negative hardness gradient.

In one embodiment, the golf ball has a solid, single-core; an intermediate layer; and a cover layer. When a single-layered core is used, the core preferably has a diameter within a range having a lower limit of 1.40 or 1.45 or 1.50 or 1.51 or 1.53 inches and an upper limit of 1.55 or 1.59 or 1.60 or 1.62 or 1.66 inches, and more preferably has a diameter within a range having a lower limit of 1.51 or 1.53 inches and an upper range of 1.55 or 1.59 inches. In a particularly preferred embodiment, the core has a diameter of about 1.53 inches.

In another embodiment, the golf ball has a dual-core (that is, a two-layered core) and a dual (two-layered) cover enclosing the core. In yet another version, a five-piece golf ball may be made having a dual core, and intermediate layer, and a dual cover. The dual-core constitutes an inner core (center) and an outer core layer. The inner core has a diameter within a range having a lower limit of 0.75 or 0.85 or 0.875 inches and an upper limit of 1.125 or 1.15 or 1.39 inches. The outer core layer encloses the inner core such that the two-layer core has an overall diameter within a range having a lower limit of 1.40 or 1.50 or 1.51 or 1.52 or 1.525 inches and an upper limit of 1.54 or 1.55 or 1.555 or 1.56 or 1.59 inches.

When a single-layered core is used, the core preferably has a center hardness within a range having a lower limit of 30 or 40 or 45 Shore C and an upper limit of 70 or 75 or 80 Shore C. The surface hardness of the core is preferably greater than 70 Shore C, or 75 Shore C or greater, 80 Shore C or greater, 85 Shore C or greater, or 90 Shore C or greater. In a particular embodiment, the surface hardness of the core is greater than the center hardness of the core to define a positive hardness gradient and more preferably the surface hardness of the core is at least 10 Shore C units greater than the center hardness of the core.

When a dual-layered core is used, the inner core (center) preferably has a geometric center hardness within a range having a lower limit of 50 or 55 or 60 Shore C and an upper limit of 65 or 70 or 80 Shore C. Meanwhile, the outer core layer preferably has an outer surface hardness of 75 Shore C or greater, or 80 Shore C or greater, or 85 Shore C or greater, or 90 Shore C or greater. And, the inner surface of the outer core preferably has a surface hardness within a range having a lower limit of 55, 60, 65, 70, or 75 Shore C and an upper limit of 80, 85, or 90 Shore C.

The intermediate (or inner cover) layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

As discussed above, the single-layered core of this invention may be enclosed with one or more cover layers. The inner cover layer(s) may be referred to as intermediate layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, single core embodiment, the outer cover and inner cover layer materials and thickness are the same but, the hardness range is reversed, that is, the outer cover layer is harder than the inner cover layer.

Figure 1:
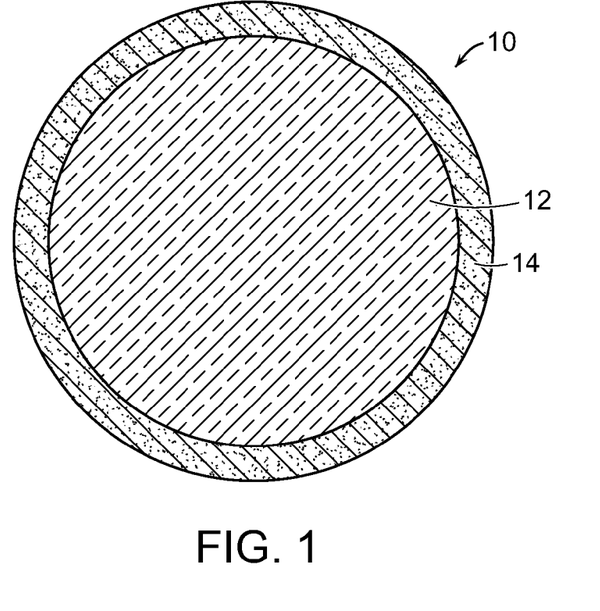
FIG. 1 is a cross-sectional view of a two-piece golf ball having an inner core made of a polyalkenamer rubber composition of this invention and a cover layer.
Figure 2:
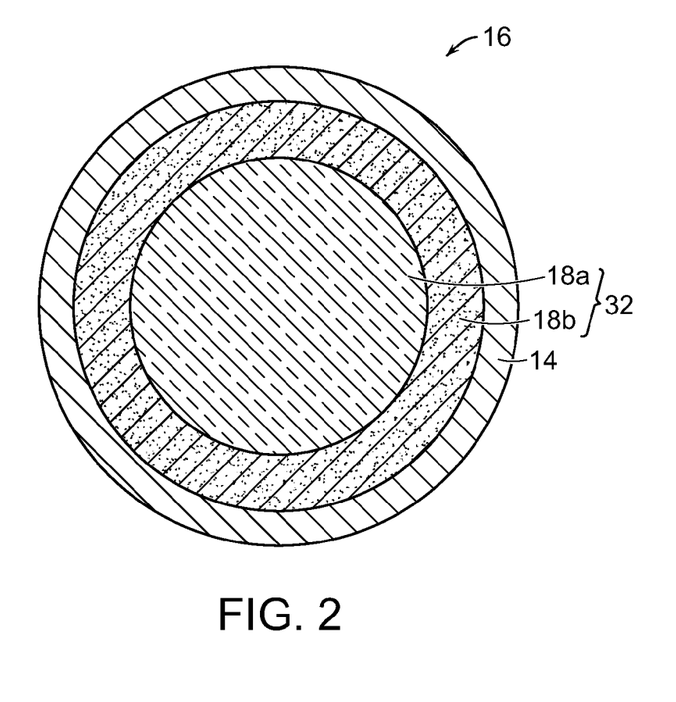
FIG. 2 is a cross-sectional view of a three-piece golf ball having a core made of a polyalkenamer rubber composition of this invention; an intermediate layer; and a cover layer.
Figure 3:
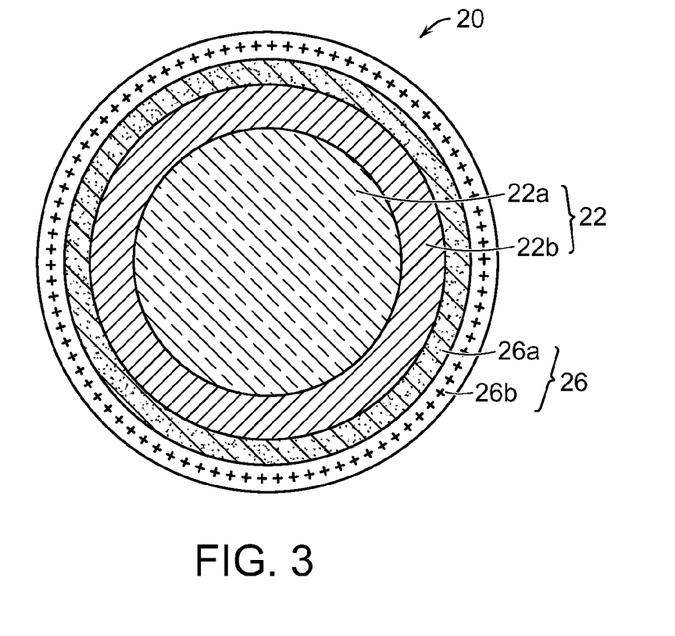
FIG. 3 is a cross-sectional view of a four-piece golf ball having a dual-core comprising an inner core and outer core made of a polyalkenamer rubber composition of this invention; an inner cover layer; and an outer cover layer.
Figure 4:
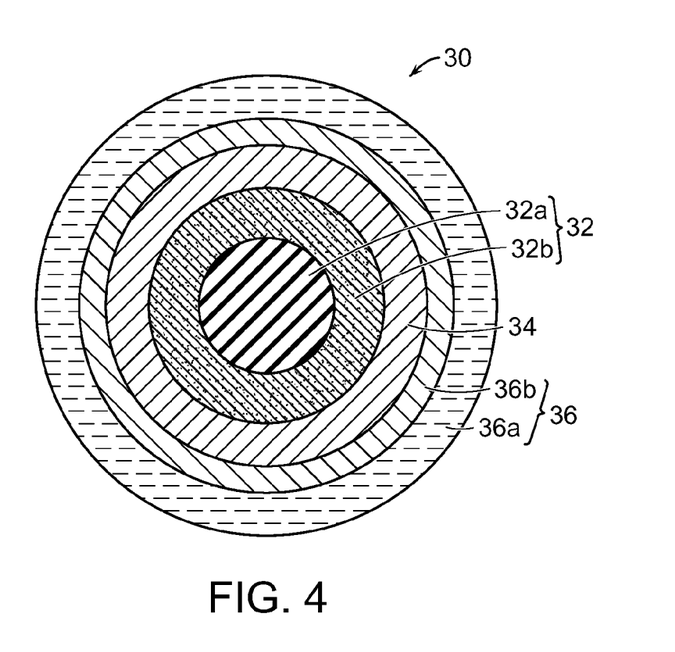
FIG. 4 is a cross-sectional view of a five-piece golf ball having a dual-core comprising an inner core and outer core made of a polyalkenamer rubber composition of this invention; an intermediate layer; an inner cover layer; and an outer cover layer.

As discussed above, the polyalkenamer/ionomer/polyamide compositions of this invention may be used with any type of ball construction known in the art. Such golf ball designs include, for example, two-piece, three-piece, four-piece, and five-piece designs. The core, intermediate casing, and cover material can be single or multi-layered. Referring to FIG. 1, one version of a golf ball that can be made in accordance with this invention is generally indicated at (10). In this two-piece golf ball (10), the ball includes a solid, single-layered core (12) and a cover layer (14). In FIG. 2, a three-piece ball (16) comprising a dual-core (18) having an inner core (18a) and outer core layer (18b) along with a cover (19) is shown. In another embodiment, as shown in FIG. 3, the four-piece golf ball (20) contains a dual-core (22) comprising an inner core (22a) and outer core layer (22b). The golf ball (20) further includes a multi-layer cover (26) comprising inner cover (26a) and outer cover (26b) layers. Turning to FIG. 4 in yet another version, a five-piece golf ball (30) containing a dual-core (32) comprising an inner core (32a) and outer core layer (32b) can be made. This ball includes an intermediate layer (34) and a multi-layered cover (36) comprising an inner cover layer (36a) and outer cover layer (36b). It should be understood the golf balls shown in FIGS. 1-4 are for illustrative purposes only and are not meant to be restrictive. It should be recognized that other golf ball constructions can be made in accordance with this invention.

In one particular construction, a golf ball comprising: a) a core having a diameter of about 1.26 to about 1.60 inches and surface hardness of about 30 to about 65 Shore D; b) at least one intermediate layer having a thickness of about 0.015 inches to about 0.120 inches and surface hardness of about 45 to about 75 Shore D; and c) a cover having a thickness of about 0.015 inches to about 0.090 inches and surface hardness of about 40 to about 70 Shore D may be made. At least one of the core, intermediate layer, or cover is formed from a rubber composition comprising: i) about 10 to about 65 weight percent of a cycloalkene rubber having a trans-content of about 55% or greater and a melting point of 30° C. or greater; ii) about 30 to about 80 weight percent of an ionomeric resin; and 3) about 5 to about 40 weight percent of a polyamide.

In another particular construction, a golf ball having a dual-core is made. The golf ball comprises: a) a core comprising an inner core and outer core layer, wherein the outer core layer is disposed about the inner core layer, the core having an overall diameter of about 1.40 to about 1.60 inches; b) an intermediate layer having a thickness of about 0.015 inches to about 0.120 inches and surface hardness of about 45 to about 75 Shore D; and c) a cover having a thickness of about 0.015 to about 0.090 inches and surface hardness of about 40 to about 70 Shore D. At least one of the inner core, outer core layer, intermediate layer, or cover is formed from a rubber composition comprising: i) about 10 to about 65 weight percent of a cycloalkene rubber having a trans-content of about 55% or greater and a melting point of 30° C. or greater; ii) about 30 to about 80 weight percent of an ionomeric resin; and 3) about 5 to about 40 weight percent of a polyamide.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball subassembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR").

The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted.

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A method of making a golf ball, comprising a solid core of at least one layer and cover of at least one layer, comprising the steps of:
   a) preparing a blend comprising cycloalkene rubber and polyamide, the cycloalkene rubber having a trans-content of about 55% or greater and a melting point of 30° C. or greater;
   b) adding an acid copolymer resin to the blend, the resin comprising a copolymer of α-olefin, $C_3$ to $C_8$ α,β-ethylenically unsaturated mono- or dicarboxylic acid, and optional softening monomer; and organic acid;
   c) adding a sufficient amount of cation source in-situ to the blend to neutralize the acid copolymer resin so that greater than 100% of the acid moieties in the resin are neutralized thereby forming an ionomeric resin and a blend composition comprising; i) about 10 to about 65 weight percent of the cycloalkene rubber; ii) about 30 to about 80 weight percent of the ionomeric resin; and iii) about 5 to about 40 weight percent of the polyamide; and
   d) forming a solid core comprising the blend composition.

2. The method of claim 1, wherein the resin comprising a copolymer of α-olefin, $C_3$ to $C_8$ α,β-ethylenically unsaturated mono- or dicarboxylic acid, and optional softening monomer is, partially neutralized prior to step c).

3. The method of claim 1, wherein the blend comprising the cycloalkene rubber and polyamide further comprises peroxide in an amount of 2.5 phr or greater based on total weight of rubber.

4. The method of claim 1, wherein the cycloalkene rubber, has a trans-content of 75% or greater and a melting point of 50° C. or greater.

5. The method of claim 1, wherein the blend composition comprises about 30 wt. % cyclolalkene rubber; about 50 wt. % ionomer; and about 20 wt. % polyamide.

6. The method of claim 1, wherein the blend composition comprises about 40 wt. % cyclolalkene rubber; about 40 wt % ionomer; and about 20 wt. % polyamide.

7. The method of claim 1, wherein the blend composition comprises about 25 wt. % cyclolalkene rubber; about 50 wt % ionomer; and about 25 wt % polyamide.

8. The method of claim 1, wherein the ionomeric resin contains greater than 16 weight percent acid groups.

9. The method of claim 1, wherein the ionomeric resin is a E/X/Y copolymer, wherein E is ethylene; X is a $C_3$ to $C_8$ α,β-ethylenically unsaturated mono- or dicarboxylic acid; and Y is a softening monomer.

10. The method of claim 9, wherein the copolymer is selected from the group consisting of ethylene/(meth)acrylic acid/n-butyl acrylate; ethylene/(meth)acrylic add/ethyl acrylate; ethylene/(meth)acrylic acid/methyl acrylate; ethylene/(meth)acrylic acid/n-butyl acrylate; and ethylene/(meth)acrylic acid/isobutyl acrylate copolymers.

11. The method of claim 1, wherein the polyamide is selected from the group consisting of polyamide 6; polyamide 6,6; polyamide 610; polyamide 11; polyamide 12; and polyamide 46, and copolymers and blends thereof.

12. The method of claim 1, wherein the polyamide is selected from the group consisting of polyamide/polyester copolymers and polyamide/polyether copolymers, and blends thereof.

13. The method of claim 1, wherein the cation source is selected from the group consisting of metal cations and salts thereof, organic amine compounds, ammonium, and combinations thereof.

14. The method of claim 13, wherein the cation source is a metal cation selected from the group consisting of lithium, sodium, potassium, magnesium, calcium, barium, lead, tin, zinc, aluminum, manganese, nickel, chromium, copper, and combinations thereof.

* * * * *